Feb. 18, 1936.  L. E. BIER  2,031,202
SIGNALING SYSTEM
Filed Oct. 17, 1933   2 Sheets-Sheet 1
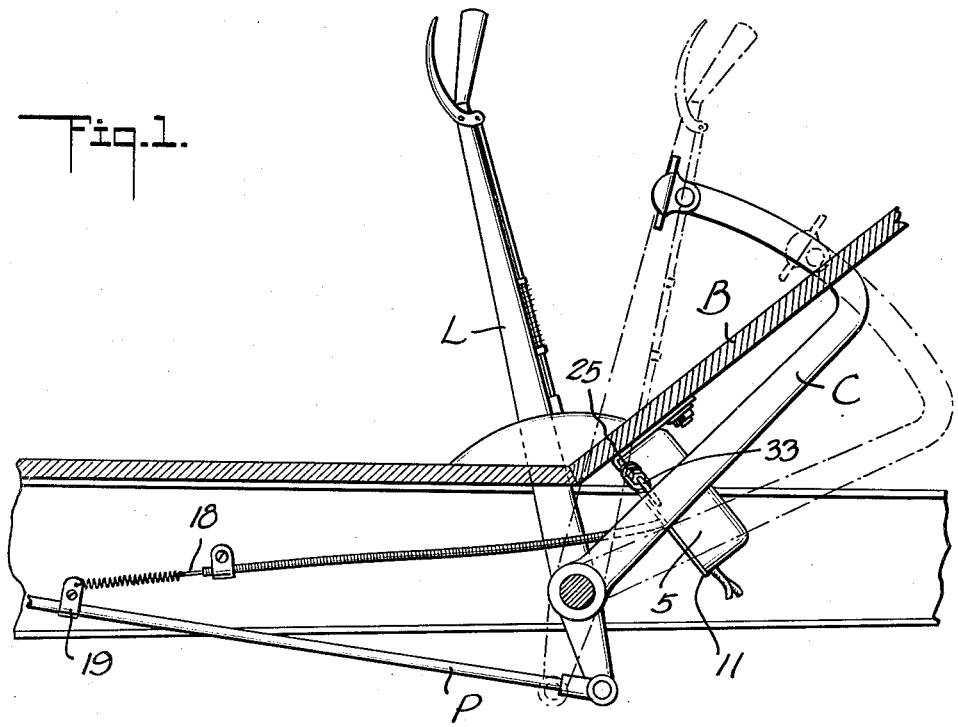
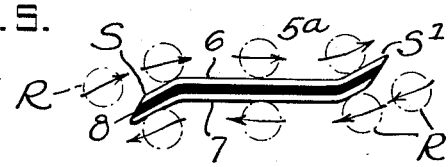
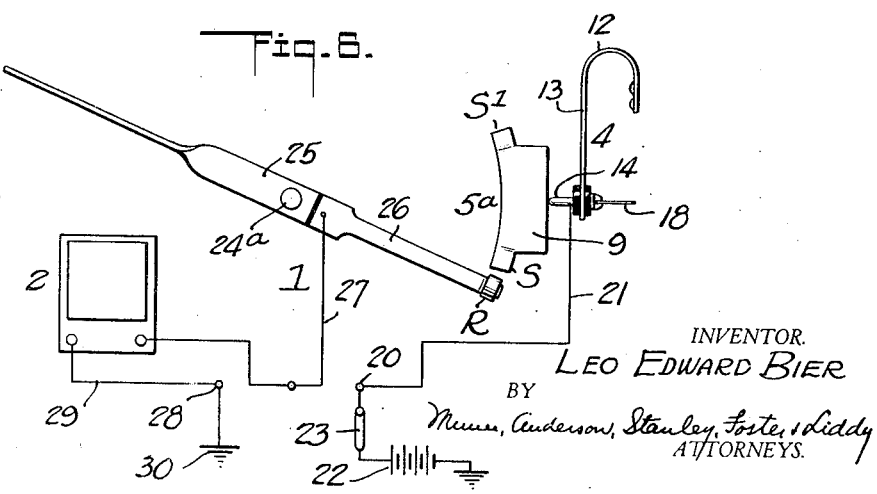
INVENTOR.
LEO EDWARD BIER Feb. 18, 1936.                L. E. BIER                2,031,202
                          SIGNALING SYSTEM
                        Filed Oct. 17, 1933            2 Sheets-Sheet 2
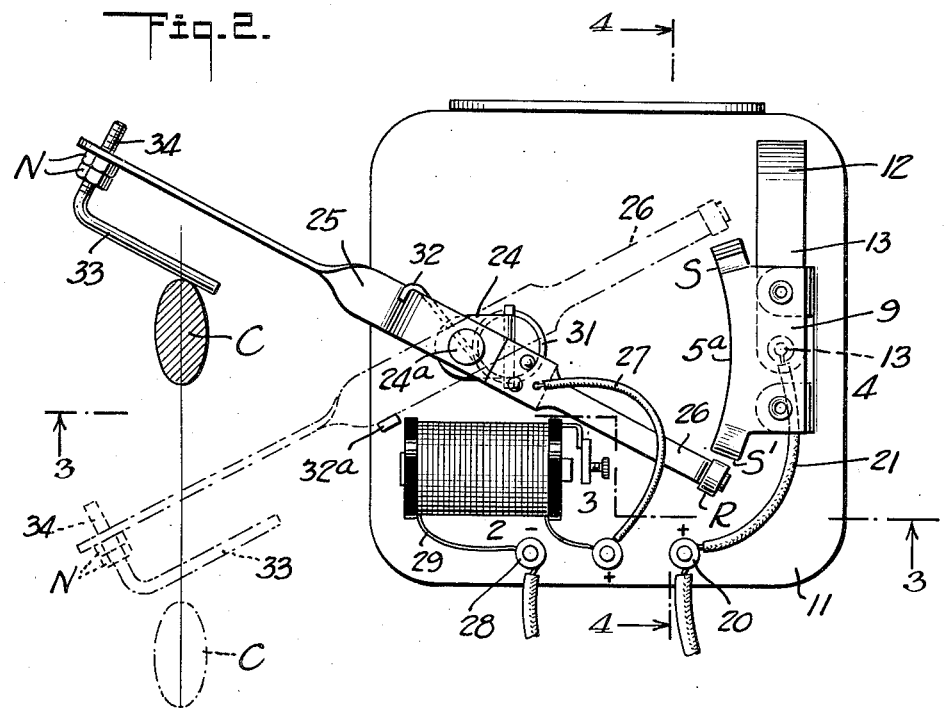
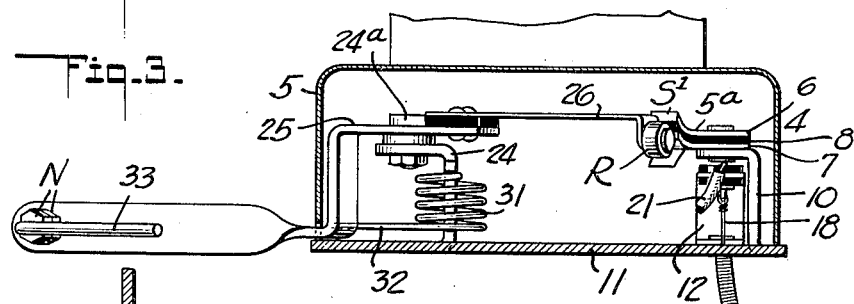
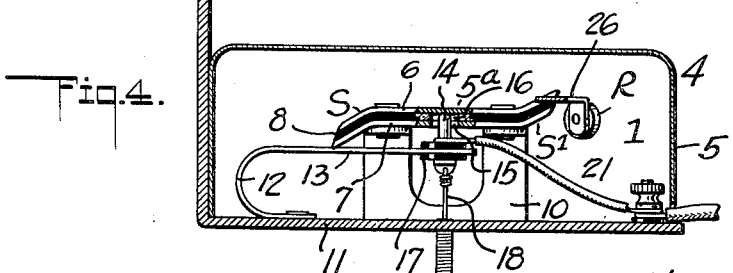
INVENTOR.
LEO EDWARD BIER
BY
Munn, Anderson, Stanley, Foster & Liddy
ATTORNEYS.

Patented Feb. 18, 1936

2,031,202

UNITED STATES PATENT OFFICE 2,031,202

SIGNALING SYSTEM

Leo Edward Bier, Los Angeles, Calif.

Application October 17, 1933, Serial No. 693,988

5 Claims. (Cl. 177—311)

This invention relates to signaling systems, and same is more particularly directed to systems for use in connection with automobiles for automatically indicating to the driver the fact of an unintended application of the emergency brake at a time when said brake should be fully released, such as just prior to shifting the clutch to its engaged position, and an object of the invention is to provide a simple, inexpensive and positively acting organization of parts in a system of this character which will automatically function through the customary actuation of the clutch pedal to warn the driver that his brakes are applied, thus enabling the driver to readily and timely release his brakes before permitting the automobile to be propelled. It is in this manner that I propose to prevent undue wear and possible burning of the brake bands through means which is foolproof and which will transmit to the driver timely warning that the brakes have not been released.

Another object of the invention is to provide means which will be thrown into operation only when the emergency brake is applied and which will prevent undesirable creation of warning sound over any objectionably long period of time, and in order that this may be satisfactorily accomplished I have provided, in the system employed, positively acting means for placing the signal in action at a particular time only, such as when adjusting the clutch to its engaged position as aforestated.

A still further object of the invention is to provide a signaling system which will not in any manner interfere with the normal use of the controlling mechanism of the automobile.

Another object is to provide mechanism of the class described which may be quickly installed and operatively related to the influencing parts of the mechanism of the automobile with which the same is to be used.

I will describe only one form of the invention and will point out the novel features thereof, but it is to be understood that changes may be made therein within the spirit of the invention and without departing from the spirit of the hereto appended claims.

In the drawings:

Figure 1 is a view in longitudinal section through the floor and foot board of an automobile showing the relationship of the parts to the clutch pedal;

Figure 2 is a view in plan of the device detached, showing the relationship of the clutch pedal to the swinging contact arm when the clutch pedal is in respectively different extreme positions;

Figure 3 is a section taken on line 3—3 of Figure 2;

Figure 4 is a section taken on line 4—4 of Figure 2;

Figure 5 is a schematic view of the cam and contact element of the circuit showing the different positions of the contact roller during actuation of the clutch pedal;

Figure 6 is a schematic view of the control circuit and co-acting circuit closing elements.

In carrying the invention into practice use is made of a control circuit 1 in which is placed a warning or sound producing device 2, the same, in the present embodiment, being in the form of an electro-magnet having a buzzer in the form of a vibratory armature 3. This buzzer constitutes a part of my improved circuit closing assembly 4, mounted in a housing 5 adapted to be attached to the under side of the inclined foot board B, as shown in Figure 1, so as to occupy a position adjacent to the customary clutch pedal C. L is a brake lever of the common construction, and same has connected therewith in the usual manner a pull rod P, whereby the brake mechanism (not shown) can be actuated as desired.

The circuit closer assembly 4 includes an arcuate rail 5a consisting of a pair of substantially identical metal strips 6 and 7, between which is interposed a strip of insulating material 8. The said plates are provided with lateral extensions 9, and same are fixedly mounted on a supporting bracket 10 to maintain said rail in a rigid position. The bracket 10 is carried by the base plate 11 of the housing 5, and has attached thereto one end of a leaf spring 12 the long branch 13 of which has a contact pin 14. This pin passes through slots 15 and 16 formed in the plate 7 and strip 8, respectively, and said pin is insulated from said spring 12 as at 17. Attached to the free end of the branch 13 of the spring 12 is one end of a wire 18, the opposite end of which is connected by a clamp 19 to the aforesaid pull rod P, whereby the pin 14, which in Figure 4 tends normally to engage against the plate 6, may be disengaged therefrom when movement in one direction is imparted to said pull rod. As shown in Figure 6 of the drawings, the pin 14 connects with the binding post 20 through the lead wire 21 of the circuit 1, the said post 20, in turn, being connected with a battery 22 through the ignition switch 23.

On the plate 11 of the aforesaid housing 5 is a supporting bracket 24, and pivoted thereto at 24a is an oscillating arm 25, the arcuate rail 5a being concentrically related to the pivot 24a, and as shown, said arm 25 carries, at one end, a normally straight leaf spring 26, the latter being connected by the lead wire 27 of the circuit 1 with the electro-magnet 2. The binding post 28 of the assembly 4 connects with the coil 2 through the lead wire 29, and as illustrated, said binding post 28 leads to the ground 30.

I have stated that the rail 5a is concentrically related to the pivot 24a. On reference to Figures 3 and 5 of the drawings, it will be noted that the plates 6 and 7 are bent angularly to provide oppositely extending cam surfaces S and S' which connect with the long intermediate portions of said plates 6 and 7. The free end of the flat leaf spring 26 carries a contact roller R. Extending about the bracket 24 is a coiled spring 31, the terminal 32 of which is connected with the arm 25 so as to hold same in the position shown in dot-and-dash lines in Figure 2, where it will be disposed immediately in the path of depressing movement of the clutch pedal C and against a stop lug 32a. Here it will be observed that the arm 25 carries a clutch pedal engaging member 33, the same having a threaded extension 34 which operatively passes through the arm 25 so that the member 33 can be adjusted relatively to the clutch pedal C. The said member may be securely held in any position of selected adjustment by the co-operable clamping nuts N—N.

In consequence of the construction and the relationship to each other of the parts just above referred to, it is obvious that with the brake lever L in the full line position shown in Figure 1 and the clutch pedal C also in the full line position shown in said Figure 1, the contact pin 14 will engage with the plate 6, and the roller R will occupy a position directly in front of the cam end S' of the rail 5a and spaced apart therefrom. With the parts in the positions last referred to, it follows that should the operator fail to release the brake lever L before or during the operation of depressing the clutch pedal C, the roller R will first travel against the under side of the rail 5a, during which time the circuit 1 will remain open because of the insulating material 8 between plates 6 and 7. But on the return movement of the roller R to its dot-and-dash position shown in Figure 2, the roller travels over the plate 6 of the rail 5a, at which time the circuit 1 will be closed, thus exciting the electromagnet 2 and producing an audible signal to timely apprise the operator of the fact that his brakes are applied. Upon this condition manifesting itself, a forward movement of the brake lever L will function to exert a pull upon the wire 18 sufficient to retract the pin 15 from the plate 6, thus breaking the circuit and preventing a further sounding of the alarm. By providing the insulating material 8 between plates 7 and 8 of rail 5a, unnecessary sounding of the alarm will be avoided during movement of spring 26 to contact roller R with plate 6.

I have now fully shown and described an automatically controlled signaling device of the character set forth, the form and construction of which is such that same can be easily and conveniently applied and made to assume a position where it will in no manner interfere with the normal operation of an automobile; one which will positively function to produce an audible warning at such time when the emergency brake is set and the operator depresses the clutch pedal without first releasing the brake; one which will function to produce an audible alarm during return movement only of the clutch pedal and before the clutch shall have been thrown in; one which will operate only in the event that the brake is in a position of applied adjustment; and one wherein provision is made to enable an adjustment to be readily made of the clutch pedal engaging member relatively to the clutch pedal in order that the circuit closing elements may operatively function at all times and precisely as intended.

It is desired that particular attention be directed to the relationship of the spring 26 to the arcuate rail 5a, and the construction of said spring to enable same to yield laterally relative to said rail, thus insuring operative correlation of the roller R with the cam ends S and S' of said rail. From the fact that the spring 26 normally tends to assume an almost straight condition as shown in Figure 3, the supporting axis of the roller occupies a position approximately in alinement with a straight line passing through the intermediate portions of the metal plates 6 and 7. But after the roller has been moved from its normal inactive position or from in front of the cam S' to the position of the cam S, Figure 5, the movement of the said roller proceeds over said cam and engages the straight intermediate section of the plate 6, the spring is slightly stressed, and, in consequence thereof, the roller R will firmly bear against said plate 6 to thereby insure a positive, yielding contact therewith. This cam action of the parts is decidedly simple and positively acting at all times and same instantly adapts itself to every movement of the clutch pedal.

What is claimed is:

1. In switch mechanism, a rail comprising metallic laminations electrically insulated from each other; a movably supported circuit closing device releasably engaging one of the laminations; resilient means for urging said circuit closing device into engagement with said one lamination; means for disengaging same therefrom; an arm having laterally resilient contact means; means for supporting the arm to oscillate relatively of the rail to enable the resilient contact means thereof to travel over said one lamination during movement of the arm in one direction and then over the other lamination during movement of the arm in another direction; means for urging said arm to a position to entirely disengage its resilient contact device from the rail; and means on the rail for camming the resilient contact means laterally to enable same to travel over the respective laminations of the rail during movement of the arm first in one direction and then in another.

2. In mechanism of the class described, a rail having a metallic surface; an oscillative arm having a yieldable contact device movable laterally of and positioned for circuit closing engagement with said surface during swinging motion of the arm in one direction; means for moving the arm laterally to dispose its contact at the other side of said surface during swinging movement of the arm in an opposite direction; means for maintaining the contact device in open circuit relationship to said surface during swinging movement of the arm in said opposite direction; a circuit closing contact device releasably engaging said metallic surface and means for yieldingly urging said circuit closing contact device into engagement with said metallic surface.

3. In mechanism of the class described, a rail having a metallic surface; an oscillative arm having a yieldable contact device movable laterally of and positioned for circuit closing engagement with said surface during swinging motion of the arm in one direction; means on the rail for moving the arm laterally to dispose its contact at the other side of said surface during swinging movement of the arm in an opposite direction; means for maintaining the contact device in open circuit relationship to said surface during swinging movement of the arm in said opposite direction; a circuit closing contact device releasably engaging said metallic surface and means for yieldingly urging said circuit closing contact device into engagement with said metallic surface.

4. In mechanism of the class described, a rail having a metallic surface; an oscillative arm having a yieldable contact device movable laterally of and positioned for circuit closing engagement with said surface during swinging motion of the arm in one direction; cam means at the ends of the rail for moving the arm laterally to dispose its contact at the other side of said surface during swinging movement of the arm in an opposite direction; means for maintaining the contact device in open circuit relationship to said surface during swinging movement of the arm in said opposite direction; a circuit closing contact device releasably engaging said metallic surface and means for yieldingly urging said circuit closing contact device into engagement with said metallic surface.

5. In a signaling system of the class described, a signal, a source of current and switching means for connecting the signal and source of current in series, said switching means including means for closing a circuit when the brake of an automobile is on, means for closing a circuit only while the clutch pedal of an automobile is being moved from clutch-disengaged to clutch-engaged position, and means whereby said switching means are in series circuit.

LEO EDWARD BIER.